United States Patent
Weber

(10) Patent No.: US 9,677,416 B2
(45) Date of Patent: Jun. 13, 2017

(54) RECIPROCATING DRIVE TRAIN

(71) Applicant: Marc Weber, San Francisco, CA (US)

(72) Inventor: Marc Weber, San Francisco, CA (US)

(73) Assignee: Marc Weber, San Francisco, CA (US)

( * ) Notice: Subject to any disclaimer, the term of this patent is extended or adjusted under 35 U.S.C. 154(b) by 205 days.

(21) Appl. No.: 14/217,189

(22) Filed: Mar. 17, 2014

(65) Prior Publication Data
US 2014/0260725 A1 Sep. 18, 2014

Related U.S. Application Data

(60) Provisional application No. 61/800,242, filed on Mar. 15, 2013.

(51) Int. Cl.
| | |
|---|---|
| B62M 1/00 | (2010.01) |
| F01D 17/14 | (2006.01) |
| F16H 19/06 | (2006.01) |
| B62M 1/30 | (2013.01) |
| B62K 3/00 | (2006.01) |
| F16H 19/08 | (2006.01) |
| B62M 1/28 | (2013.01) |

(52) U.S. Cl.
CPC ............ F01D 17/141 (2013.01); B62K 3/002 (2013.01); B62M 1/28 (2013.01); B62M 1/30 (2013.01); F16H 19/06 (2013.01); F16H 19/08 (2013.01); *Y10T 74/188* (2015.01); *Y10T 74/1884* (2015.01); *Y10T 74/18784* (2015.01)

(58) Field of Classification Search
CPC . B62M 1/24; B62M 1/26; B62M 1/28; B62M 1/32; B62M 1/30
USPC .................................................. 280/253, 221
See application file for complete search history.

(56) References Cited

U.S. PATENT DOCUMENTS

| | | | | |
|---|---|---|---|---|
| 2,086,445 | A * | 7/1937 | Smith | B62M 1/30 280/221 |
| 4,463,963 | A * | 8/1984 | Martin | B62M 1/26 280/221 |
| 5,335,927 | A * | 8/1994 | Islas | B62M 1/28 280/254 |
| 5,716,069 | A * | 2/1998 | Bezerra | B62M 1/30 280/253 |
| 5,988,662 | A * | 11/1999 | Staehlin | B62M 1/28 280/251 |
| 6,173,981 | B1 * | 1/2001 | Coleman | B62K 3/002 280/221 |
| 6,298,740 | B1 * | 10/2001 | Bridges | B62M 1/26 74/119 |
| 6,412,802 | B1 * | 7/2002 | Kugel | B62M 1/00 280/252 |
| 6,578,861 | B2 * | 6/2003 | Park | B62M 1/30 280/252 |
| 6,619,682 | B1 * | 9/2003 | Carr | B62K 3/002 280/253 |

(Continued)

Primary Examiner — Joseph Rocca
Assistant Examiner — Conan Duda
(74) Attorney, Agent, or Firm — Kali-Law Group, P.C.

(57) ABSTRACT

A drive mechanism for a vehicle is disclosed, said drive mechanism converting the reciprocating clockwise-counterclockwise motion of an input shaft into continuous rotation of an output shaft by means of two one-way clutches mechanically coupled to the input shaft and the output shaft, said one-way clutches having their power stroke in opposite directions of rotation. In an embodiment, said drive mechanism can be contained in a wheel hub and used for human-powered vehicles such as scooters, bicycles, wheelchairs, rollerskates, or other vehicles.

9 Claims, 8 Drawing Sheets

(56) References Cited

U.S. PATENT DOCUMENTS

| | | | |
|---|---|---|---|
| 6,688,624 B2 * | 2/2004 | Christensen | B62K 3/002 280/220 |
| 6,716,141 B2 * | 4/2004 | Bhoopathy | B62K 3/002 280/221 |
| 6,749,211 B1 * | 6/2004 | Yliniemi | B62K 3/005 280/254 |
| 7,581,742 B2 * | 9/2009 | Chiu | B62K 3/002 280/252 |
| 7,938,419 B2 * | 5/2011 | Leslie | B62M 1/14 280/225 |
| 7,938,420 B1 * | 5/2011 | Mirabile | B62M 1/24 280/252 |
| 8,025,303 B2 * | 9/2011 | Sakirov | B62M 1/30 280/252 |
| 8,336,897 B2 * | 12/2012 | Leslie | B62K 3/005 280/225 |
| 2002/0006852 A1 * | 1/2002 | Salgado | B62M 1/24 482/57 |
| 2003/0071435 A1 * | 4/2003 | Schaeffer | A61G 5/023 280/248 |
| 2008/0054589 A1 * | 3/2008 | Scarborough | B62K 3/10 280/254 |
| 2010/0044995 A1 * | 2/2010 | Park | B62M 1/16 280/246 |
| 2013/0205928 A1 * | 8/2013 | Hansen | B62M 1/24 74/37 |
| 2014/0246840 A1 * | 9/2014 | Sobolewski | B62M 1/16 280/211 |
| 2014/0265210 A1 * | 9/2014 | Scolari | B62M 1/24 280/236 |

* cited by examiner though not necessarily at a constant speed, and it drives spur gear 110 in the same way. Spur gear 110 is mechanically linked to two one-way clutches whose power strokes are in opposite directions.

RECIPROCATING DRIVE TRAIN

CROSS-REFERENCE TO RELATED APPLICATIONS

The present application claims the benefit of U.S. Provisional Patent Application No. 61/800,242, filed on Mar. 15, 2013, which is incorporated herein by reference in its entirety. A redacted version of the Provisional Patent Application is incorporated as an Appendix.

BACKGROUND OF THE INVENTION

Field of the Invention

The present invention relates to human-powered drive trains for vehicles.

Background

Human-powered vehicles, such as bicycles, scooters, wheelchairs, and others, involve a variety of drive train designs, such as standard bicycle pedals on crank arms (for a bicycle), pushing the vehicle with a foot (for a scooter), pushing the wheels manually (for a wheelchair) and so on. The manually pushed designs, such as scooters and wheelchairs, are inefficient. The pedal-powered designs, such as bicycles, suffer from a different problem, namely that the feet have to move in an extremely constrained path (circle), which is un-ergonomic and offers inefficient leverage for a large portion of the pedal stroke.

To address the problems, lever action drives have been developed. Such drive trains convert reciprocating motion into rotary motion, avoiding dead spots and inefficiency, and in some cases allowing two or more driving limbs to function independently. However, the existing designs are relatively complex and expensive. A simpler design is needed for converting reciprocating motion into rotary motion.

SUMMARY OF THE INVENTION

An object of the present invention is to provide a drive train that converts reciprocating motion into rotary motion in a simple way that is cheap and easy to maintain.

Another object of the present invention is to provide a drive train that converts reciprocating motion into rotary motion and where the mechanism can be contained in the hub of a wheel.

Another object of the present invention is to provide a drive train that allows for flexible routing of power between the input mechanism and the output one-way clutches.

Another object of the present invention is to provide a drive train that includes virtual gearing through mechanisms that can modify the effective leverage of the inputs on the fly.

In its preferred embodiment, the present invention comprises a drive train comprising two one-way clutches whose power strokes are directed in opposite directions of rotation, both mechanically coupled with an input pulley that moves in a reciprocating fashion. When the input pulley moves in one direction, it engages one of the one-way clutches and lets the other one spin freely; when it moves in the opposite direction, it engages the other one of the one-way clutches, and lets the first one spin freely. This way, the output shaft moves in one direction, even though the input pulley is moving back and forth in a reciprocating fashion.

The input pulley is preferably moved by an input element, which can be a cable, a chain, a rope, a belt, or any other mechanical connector that enables it to move in a reciprocating fashion.

In the preferred embodiment, the power source to the input element comes from human muscles; however, the power source may be mechanical, chemical, or animal.

The input element may comprise an internal gear that is mechanically connected to the input pulley, said internal gear comprising two cables attached to it in such a way as to cause the internal gear to rotate clockwise when one cable is pulled and counterclockwise when the other cable is pulled. The location of the cable attachments can be adjustable in order to change the leverage of the transmission.

The cable attachment locations may be adjusted by a scissor mechanism that can be turned by a screw.

In the preferred embodiment, the entire assembly is contained within the hub of a wheel, and comprises mounting devices for attachment of the hub to a vehicle.

In another embodiment, the input pulley, the first one-way clutch and the second one-way clutch are coplanar.

The drive train of the present invention may be used in vehicles such as scooters, wheelchairs, bicycles, rollerskates, or any other wheeled vehicle. The power may be supplied by reciprocating foot pedals, rotating foot pedals, hand levers, hand pulls, or any combination of the above.

DETAILED DESCRIPTION OF THE PREFERRED EMBODIMENT

Figure 1A:
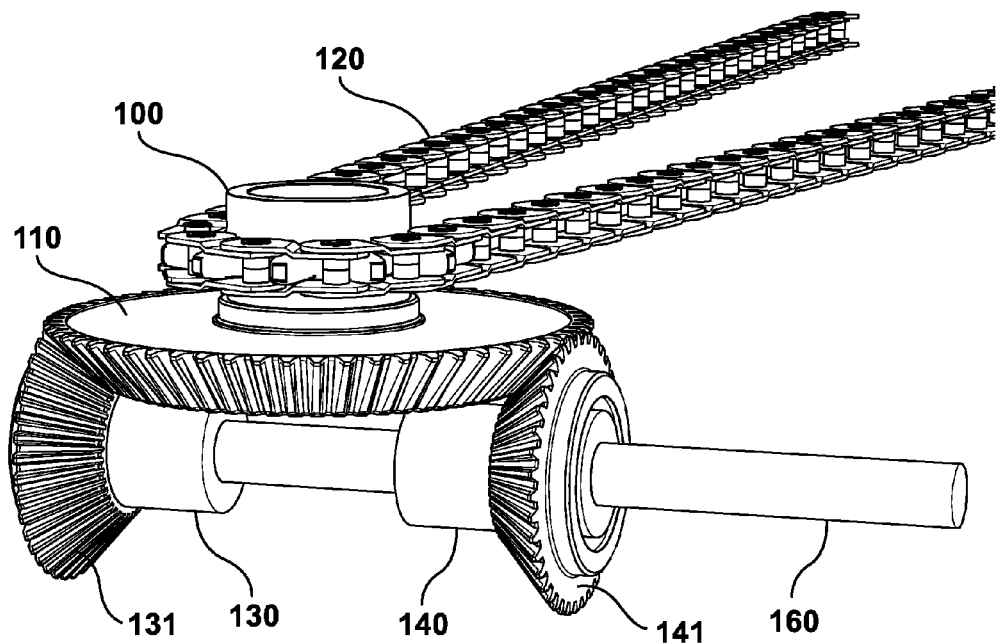
FIG. 1A shows the basic principle of the drive train design of the present invention.

FIG. 1A shows the basic principle of the drive train design of the present invention. Input pulley or sprocket 100 is connected to spur gear 110. A chain 120 is wrapped around the input pulley 100 and connected to an input mechanism (such as pedals or hand pulls). The input pulley 100 moves clockwise and counterclockwise in a reciprocating fashion, pulled by the chain. When the input pulley 100 moves in one direction, the spur gear 110 transfers its force to a first one-way clutch 130 by means of a first gear 131, while a second one-way clutch 140 rotates freely without engaging the output shaft 160. When the pulley 100 moves in the other direction, the spur gear 110 transfers its force to the second one-way clutch 140 by means of a second gear 141, and the first one-way clutch 130 rotates freely without engaging the output shaft 160. This keeps the output shaft 160 rotating in one direction, even though the input pulley 100 moves back and forth. In the preferred embodiment, the one-way clutches are standard bidirectional bicycle freewheels, either ratchet and pawl or coaster hub designs, such as are well known in the art of human-powered vehicle design. However, any one-way clutch design may be used for the present invention as long as it provides force in only one direction and does not have too much internal friction. Since the power is provided to the input pulley or sprocket by pulling on a cable, chain, or other drive line, the location of the input mechanism or mechanisms, and the number and type of input mechanism, can be extremely flexible.

Figure 1B:
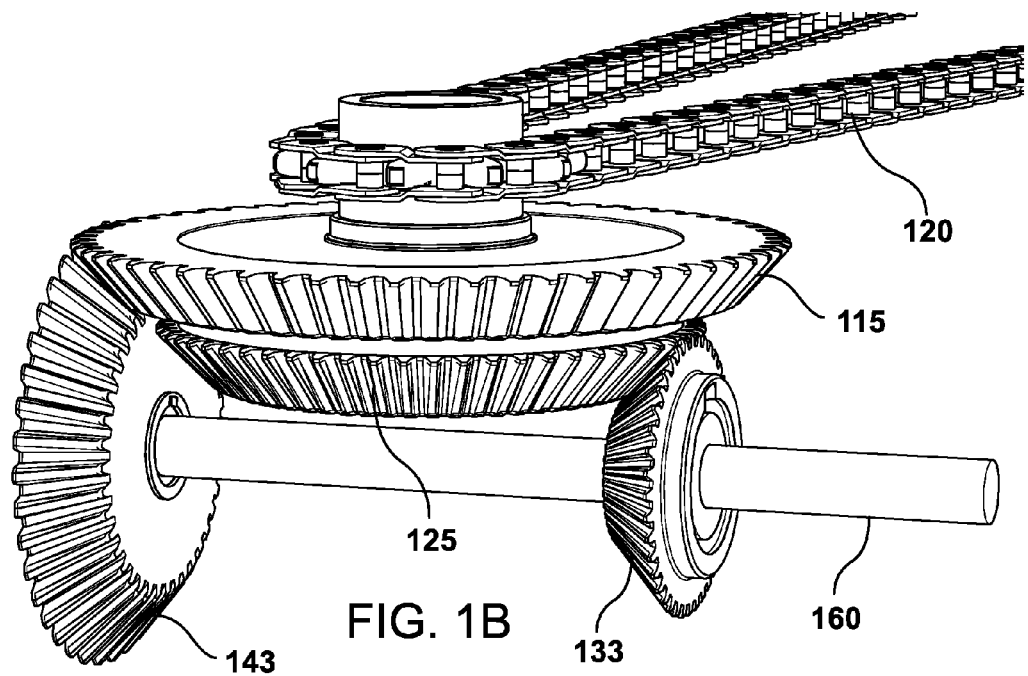
FIG. 1B shows an alternate embodiment of the drive train design of the present invention.

Since the spur gear 110 may be heavy and require a lot of torque to reverse its direction, an alternate embodiment, as shown in FIG. 1B, shows the input pulley or sprocket connected to two big coaxial gears 115 and 125 mounted on one-way clutches, rotating in opposite directions. Each big coaxial gear is connected to a gear 143 and 133 mounted on the output shaft 160. The big coaxial gears 115 and 125 are mounted on opposite-direction one-way clutches (i.e. the power stroke for each one-way clutch is in opposite directions), therefore each big coaxial gear rotates in only one direction. The two sets of coaxial gear plus output shaft gear are matched so that they produce the same effective output ratio.

Note that the connection between the input pulley or sprocket and the power source may be a cable, a chain, a toothed belt, or any other power transmission device known in the art. A chain is preferable for the preferred embodiment of the present invention, due to its strength and low slippage.

Figure 2A:
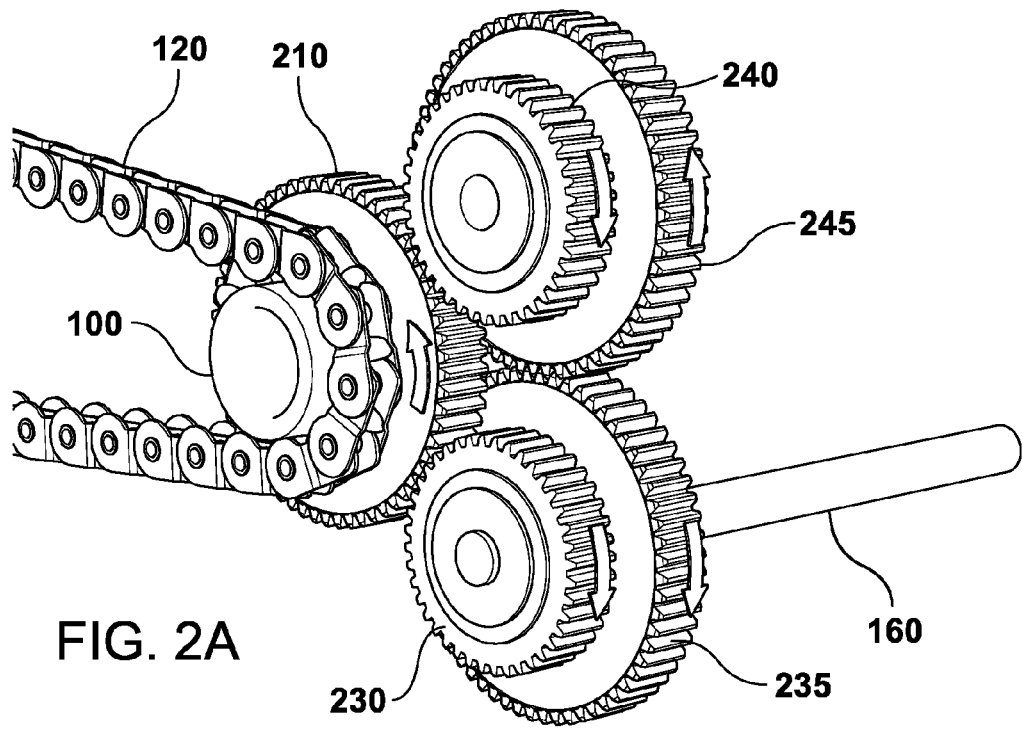
FIG. 2A shows an alternate embodiment of the drive train design of the present invention.
Figure 2B:
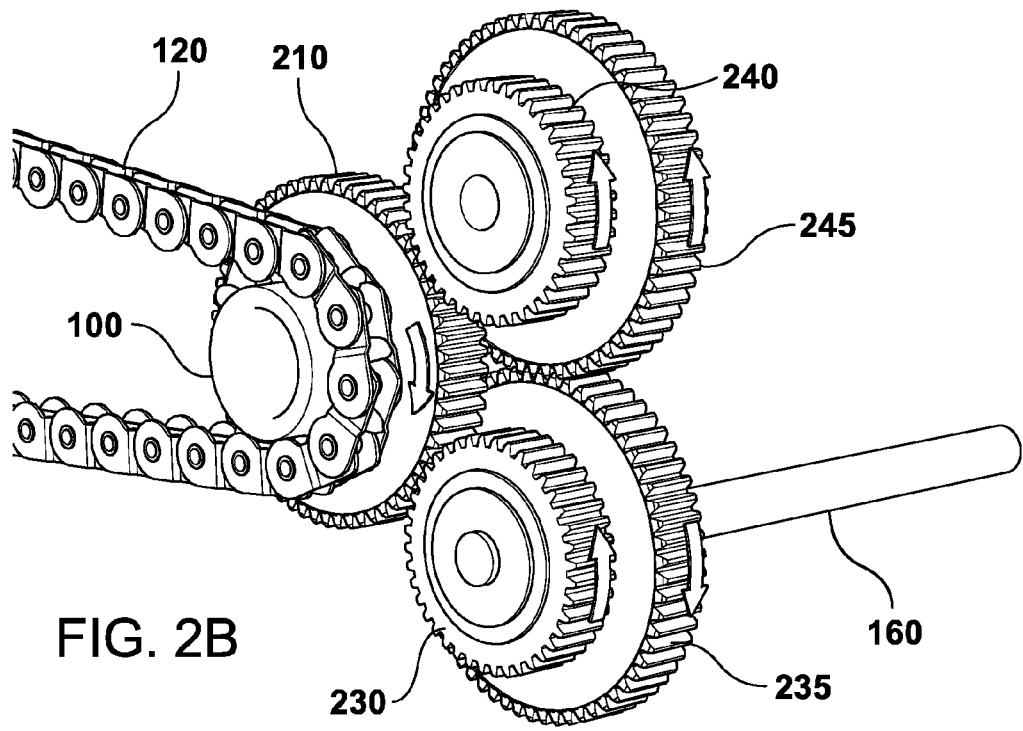
FIG. 2B shows another view of the alternate embodiment of the drive train design of the present invention, in this case with the input chain moving clockwise rather than counterclockwise.
Figure 3A:
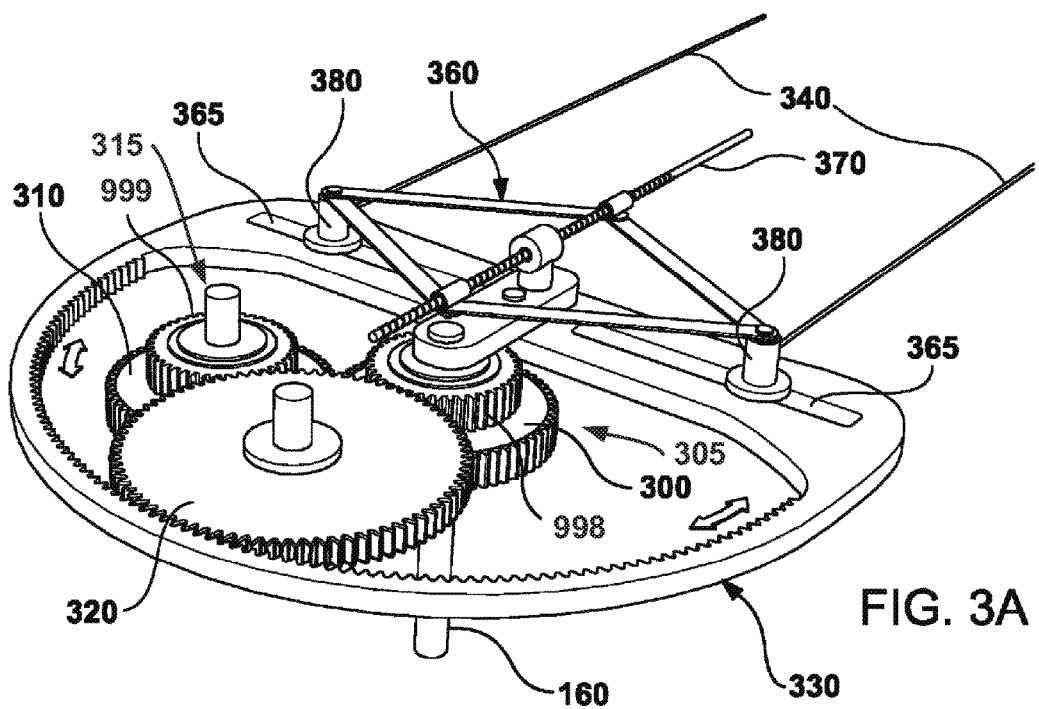
FIG. 3A shows an alternate embodiment of the drive train design of the present invention, contained in a wheel hub and with a virtual gearing mechanism.
Figure 3B:
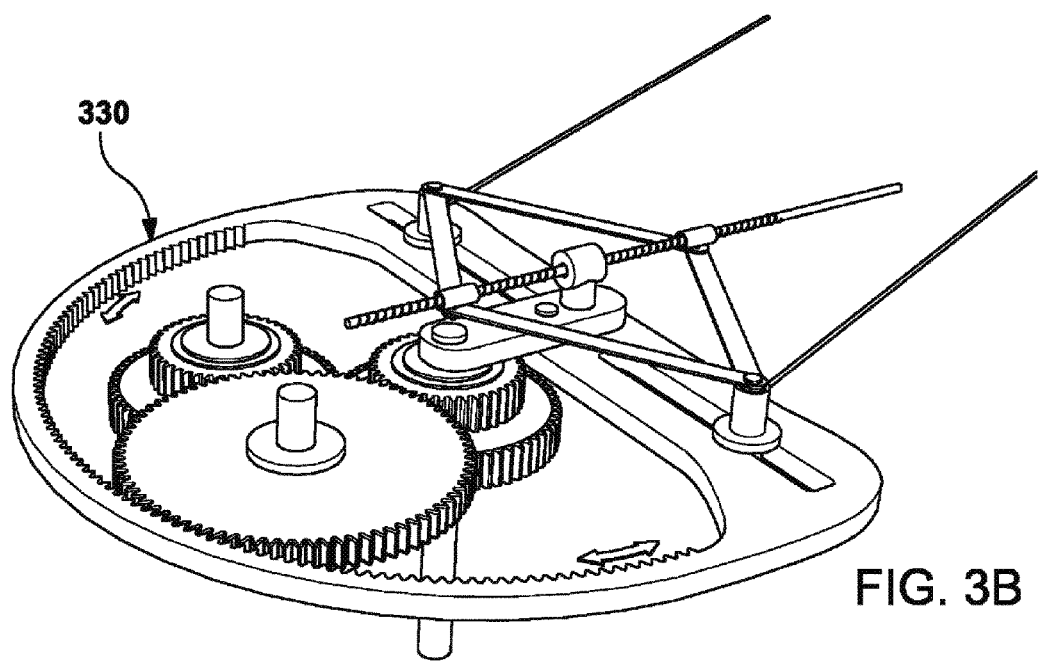
FIG. 3B shows another view of the alternate embodiment of the drive train design of the present invention, contained in a wheel hub and with a virtual gearing mechanism.
Figure 3C:
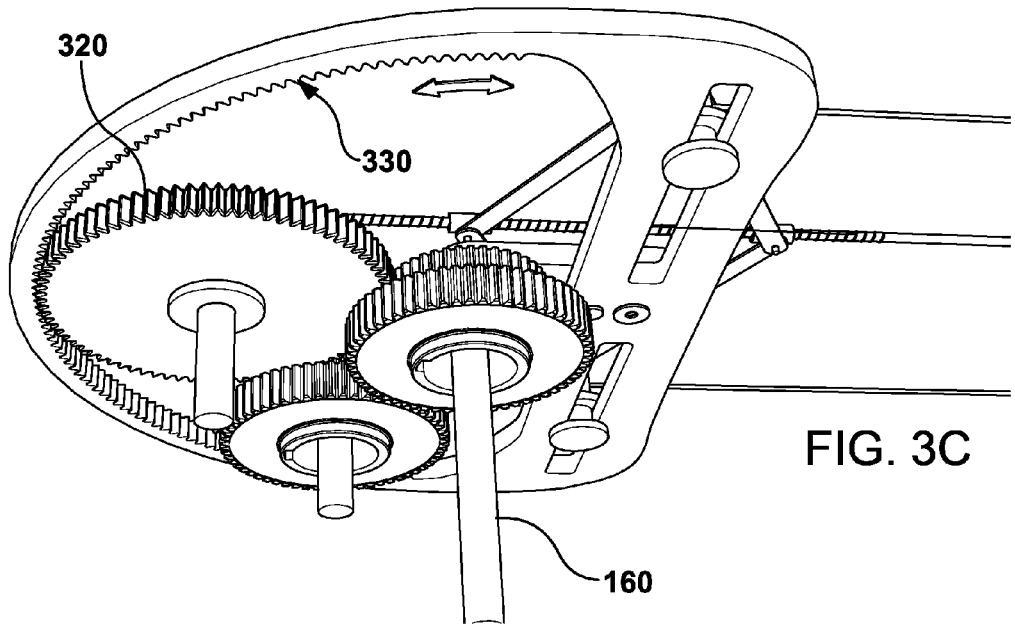
FIG. 3C shows another view of the alternate embodiment of the drive train design of the present invention, contained in a wheel hub and with a virtual gearing mechanism.
Figure 3D:
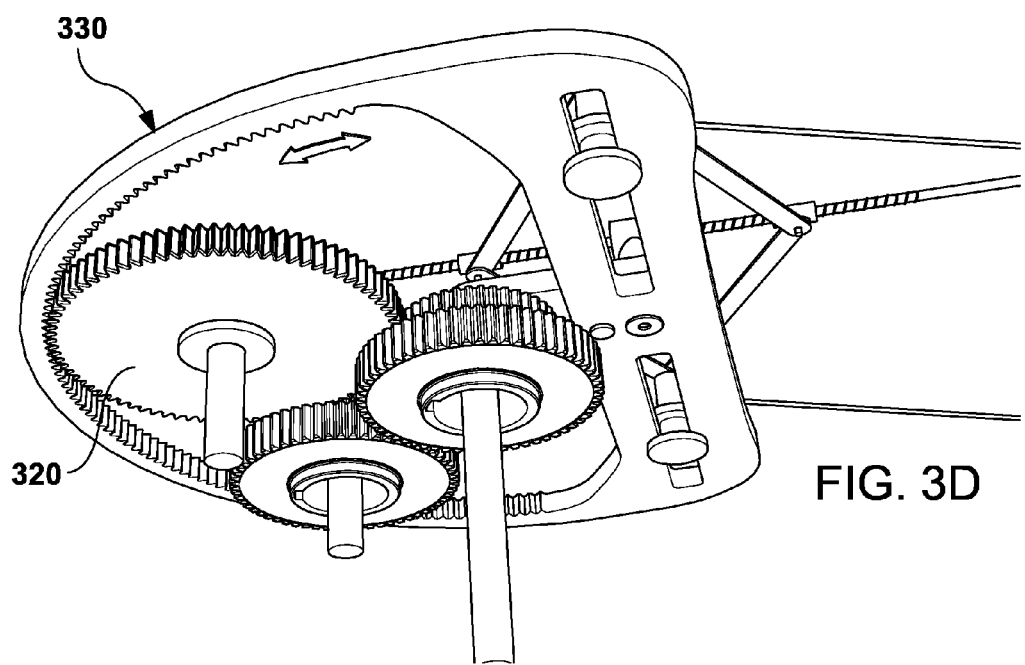
FIG. 3D shows another view of the alternate embodiment of the drive train design of the present invention, contained in a wheel hub and with a virtual gearing mechanism.

FIGS. 2A and 2B show an alternate embodiment of the present invention that is coplanar. Input pulley 100 moves clockwise and counterclockwise in a reciprocating fashion, pulled by the chain 120. The input pulley 100 is connected to a spur gear 210 that is linked to two one-way clutches 230 and 240. The first one-way clutch 230 is connected to the output shaft 160. The second one-way clutch 240 is connected to a second gear 245 that moves in the opposite direction from the second one-way clutch 240, and is linked to a first gear 235 that moves in the same direction as the first one-way clutch 230. As in the other embodiments, the two one-way clutches are positioned such that their power strokes are in opposite directions. Thus, when the input pulley 100 moves in a reciprocating motion, the output shaft 160 rotates in one direction. The direction of rotation is shown in the Figure. While the embodiment described in FIG. 2A has the second one-way clutch gear rotating in the opposite direction from the second one-way clutch, while the first one-way clutch gear rotates in the same direction as the first one-way clutch, this can easily be reversed, as shown in FIG. 2B.

As mentioned above, the one-way clutches can be any design as long as they provide rotational force in only one direction and disengage when rotating in the other direction. Ratchet and pawl clutches, such as are used in bicycles, are suitable, as are bike coaster hub type freewheels. For applications other than vehicles, such as winches or various types of tools, higher friction industrial one-way clutches including roller clutches and sprag clutches may be used, or even crude ratchets such as are found on tie-down straps.

An alternative design to a conventional one-way clutch is a wheel covered with something approximating fur, which can be rubbed easily in one direction and not in the other. Such a wheel would easily turn in one direction and resist turning in the other. Other alternative designs which allow power transmission in one direction but not in the other may also be possible.

The drive train of the present invention may be entirely contained within a hub of a wheel for a vehicle such as a bicycle or a scooter. FIGS. 3A-3D show such a design. The primary drive gear 300 is concentric to the output shaft 160, and contains a first one-way clutch 305 inside it. It is mechanically linked to the secondary gear 310, containing a second one-way clutch 315 by means of a transfer gear 320 connected to the inside gear 330. The inside gear 330 is a partial circle with inside gear teeth that is mechanically linked to the transfer gear 320. When the inside gear 330 rocks back and forth, the transfer gear 320 transfers the energy to either the first or the second one-way clutch, depending on direction, and keeps the primary drive gear 300 rotating in one direction.

In one embodiment, the first one-way clutch 305 comprises a primary drive gear 300 and a first small gear 998, the second one-way clutch 315 comprises a secondary gear 310 and a second small gear 999, and the transfer gear 320 comprises a large input gear, the large input gear being mechanically coupled with the first small gear 998 and the second small gear 999, where the first small gear 998 and the primary drive gear 300 are concentric and mechanically coupled to rotate in the same direction, and the second small gear 999 and the secondary gear 310 are concentric and mechanically coupled to rotate in opposite directions, when the transfer gear 320 moves in a first direction. In this embodiment, the first small gear 998 and the primary drive gear 300 are mechanically coupled to rotate in opposite directions, and the second small gear 999 and the secondary gear 310 are mechanically coupled to rotate in the same direction, when the transfer gear 320 moves in a second direction opposite the first direction.

Cables 340 are used to pull the inside gear 330 back and forth. In an embodiment, the attachment points for the cables to the inside gear can be moved, thus changing the lever arm. As shown in the Figures, scissor mechanism 360 can be used to slide the cable attachment points 380 along the slot or rail 365 by turning the screw 370. This changes the lever arm, thus changing the effective "gearing" of the vehicle.

Figure 5:
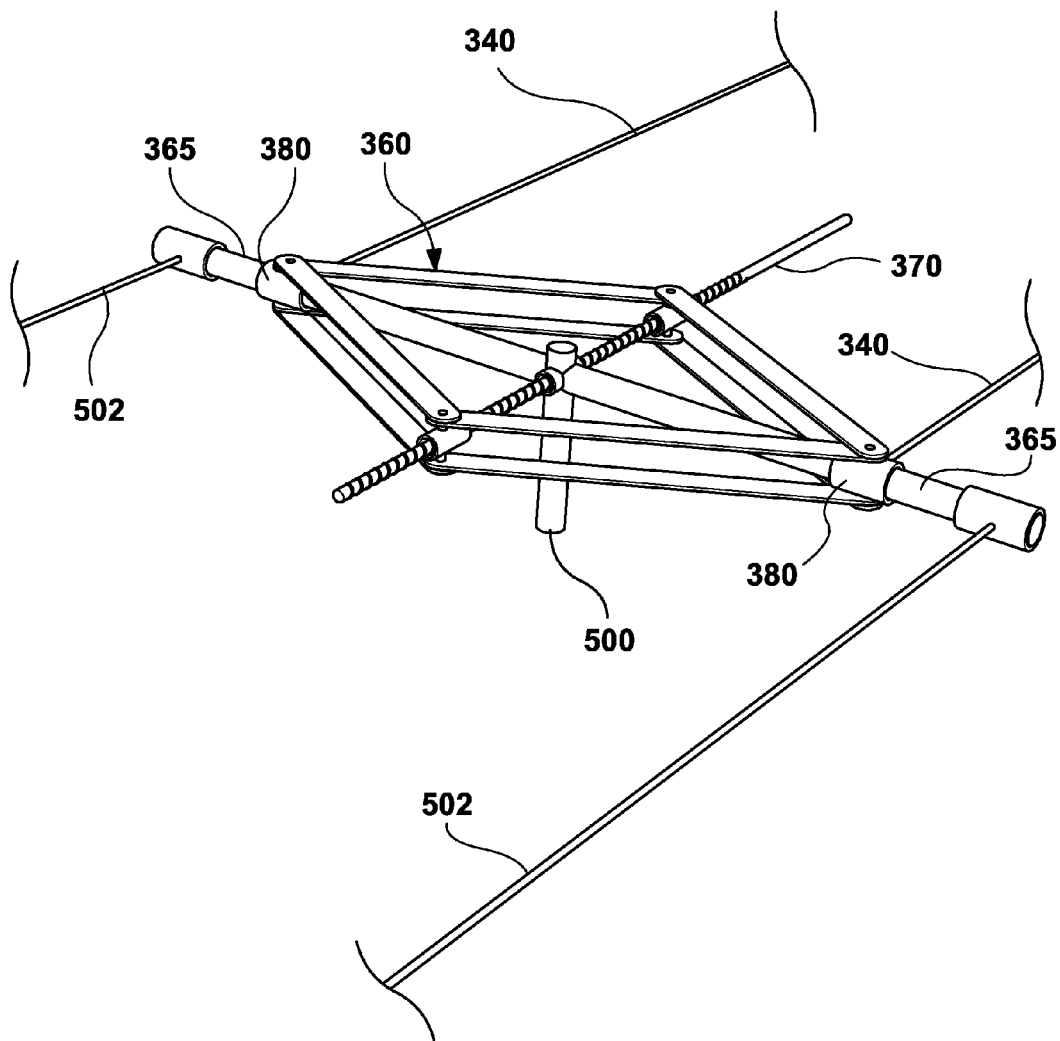
FIG. 5 shows a virtual gearing mechanism for an embodiment of the drive train of the present invention.

The scissor mechanism 360 can be connected to a screw, as shown in FIGS. 3A-3D, or can be connected to any other mechanism that can move the cable attachment points 380 along the slot or rail 365. In an alternate embodiment shown in FIG. 5, the scissor mechanism 360 is actually not mounted on the inside gear 330, but is connected to the cables elsewhere and mounted to the vehicle on a rotating mount 160. Cables 502 are linked to the inside gear 330 (not shown in FIG. 5) or other final drive mechanism including those portrayed in FIGS. 1A-2B, and are permanently attached to the ends of slot or rail 365. Cables 340 are connected to the input mechanism (not shown in FIG. 5) and are attached to cable attachment points 380, which are attached to the scissor mechanism 360 and can slide along the length of the slot or rail 365. When the screw 370 is tightened, scissor mechanism 360 moves the cable attachment points 380 closer to the rotating mount 160, thus changing the lever arm and the gearing of the vehicle.

FIGS. 4A-4D show a scooter design 400 implementing an embodiment of the present invention. The hub of the present invention 420 shown in FIGS. 3A-3D is incorporated into the rear wheel 402. The front wheel 403 rotates freely in this embodiment, though it may also incorporate the hub of the present invention for a front-wheel drive or all-wheel drive vehicle. Reciprocating pedals 460 are provided for the user to add power to the device, and are hinged in front. A chassis 401 conceals the drive cables that are used to transfer power from the pedals 460 to the hub 420. Steering is provided via standard scooter handlebars, connected to the scooter by means of a stem 404.

In the embodiment shown in the Figures, the handlebars provide an additional source of power to the vehicle. Since normally, when pedaling a bicycle or scooter, the user naturally pushes and pulls on the handlebars to balance the foot action, it is desirable to capture the natural motion by making the handlebars into active levers that add power to the vehicle. The handles 450 are hinged at hinges 451 and able to move up and down. Drive cables 440 are connected to the handles 450 and routed through the stem 404 and the chassis 401 to provide additional power to the hub 420. However, in other embodiments of the vehicle (not shown), the handlebars may be simple passive handlebars that provide steering only, but no power.

Figure 4A:
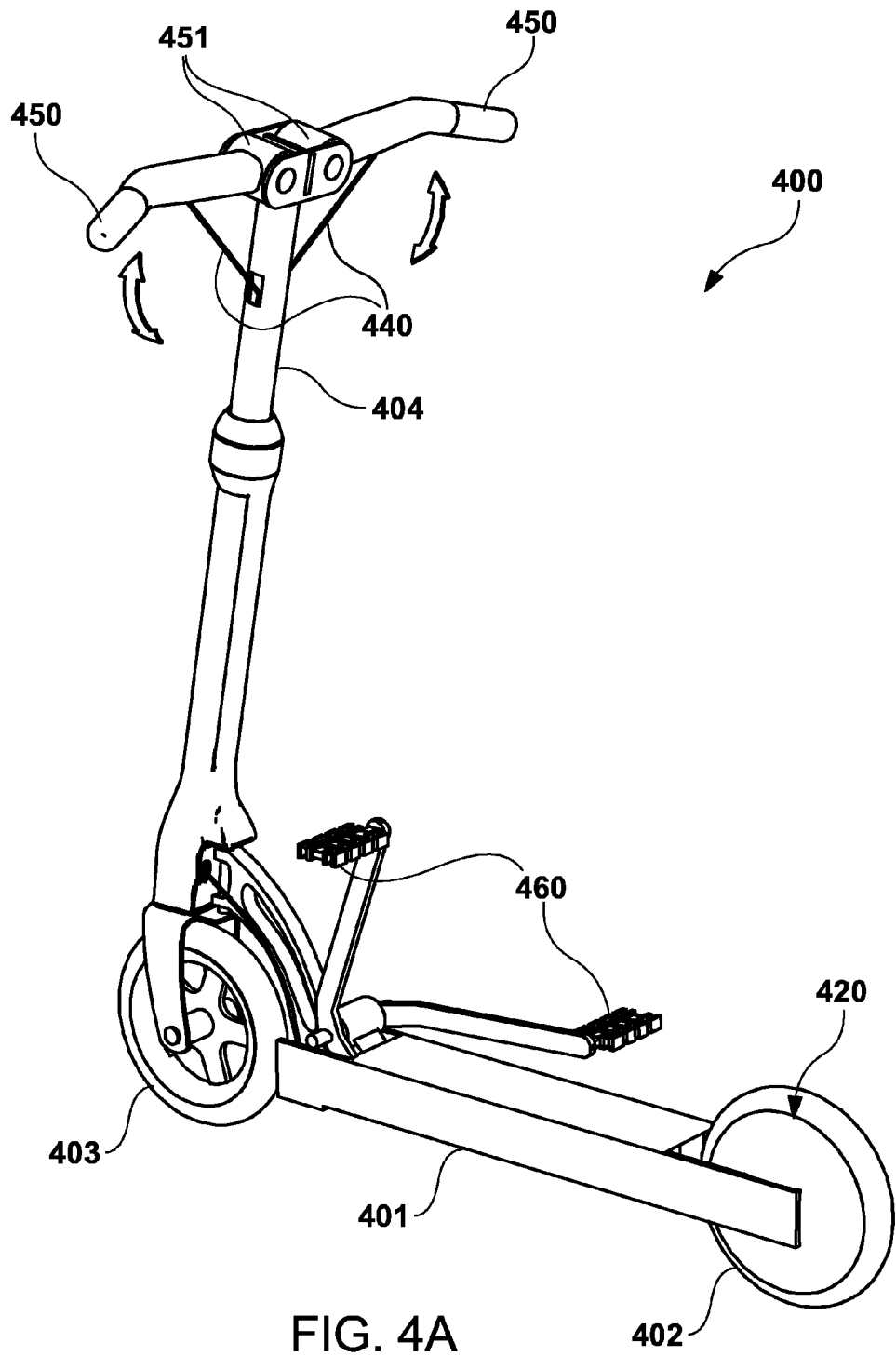
FIG. 4A shows a scooter design incorporating the drive train of the present invention.
Figure 4B:
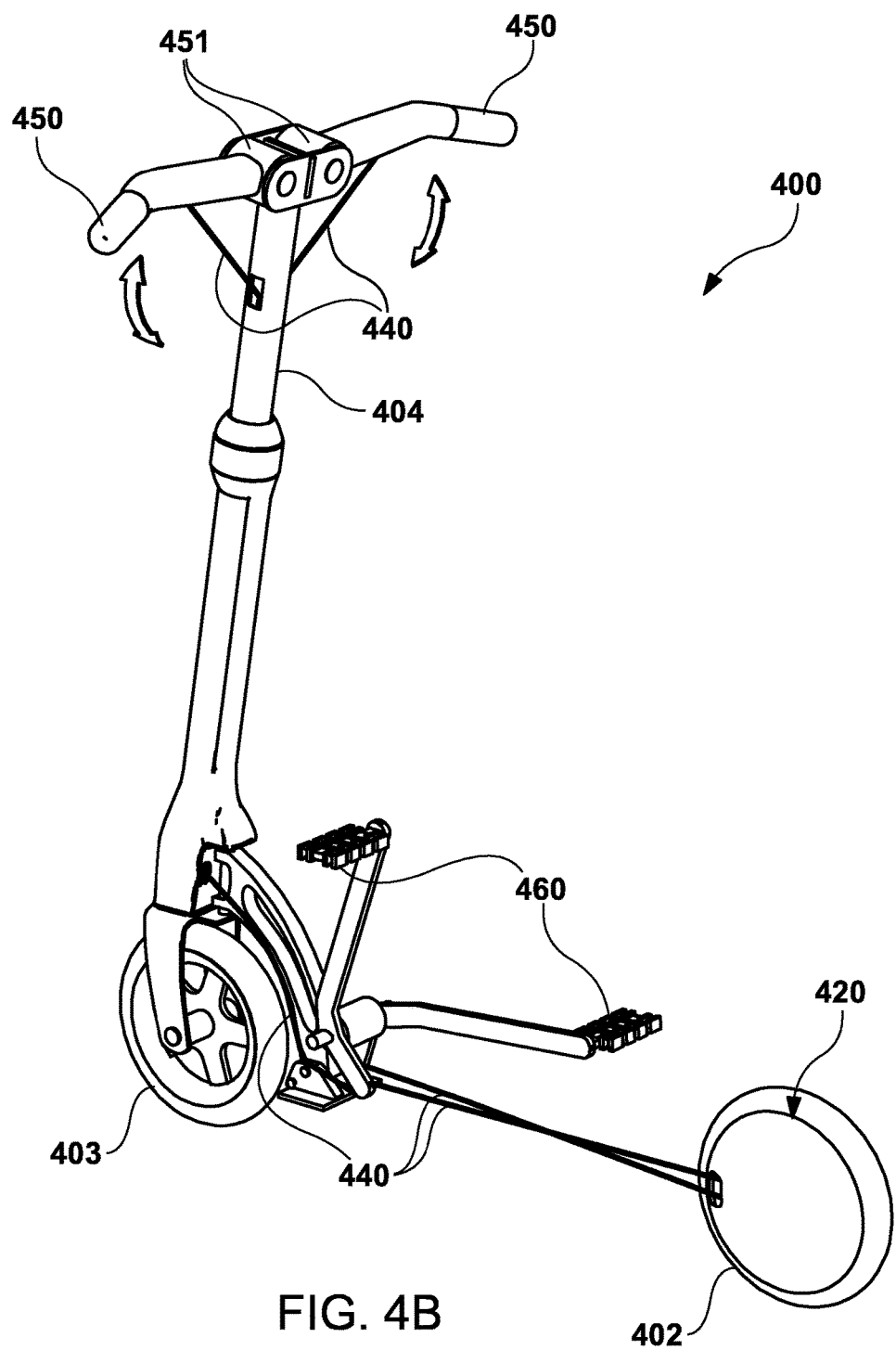
FIG. 4B shows an internal view of a scooter design incorporating the drive train of the present invention.
Figure 4C:
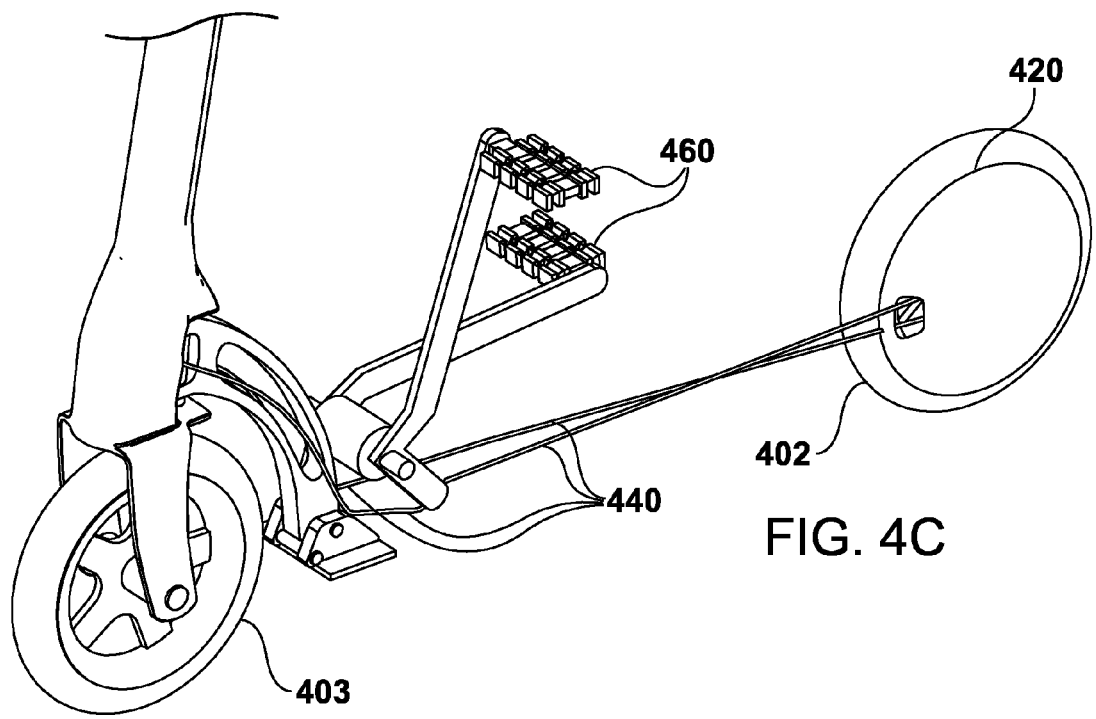
FIG. 4C shows an internal view of a scooter design incorporating the drive train of the present invention.

FIGS. 4B and 4C show the scooter 400 with the chassis 401 removed, showing the drive cables. Drive cables 440 are routed from the handlebars 450, through the pedals 460, to the hub to provide power to the vehicle.

Figure 4D:
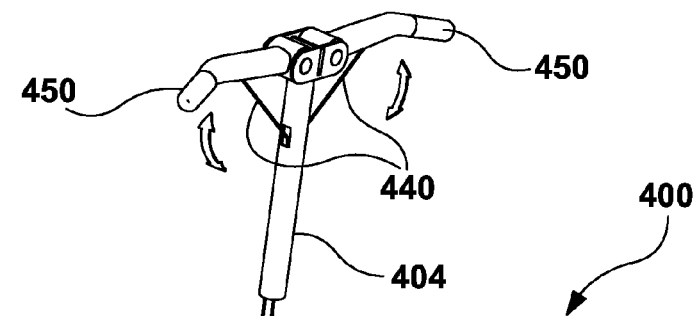
FIG. 4D shows an internal view of a scooter design incorporating the drive train of the present invention.
Figure 4D:
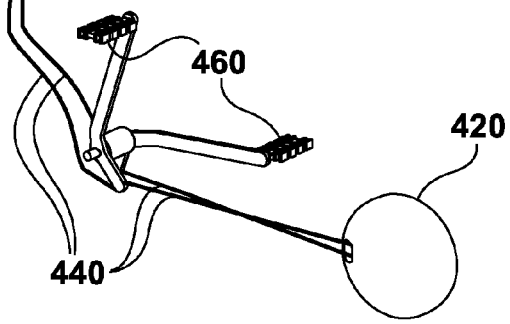

FIG. 4D shows the drive train of the scooter, showing the routing of the cables 440, the pedals 460, and the hub 420.

It must be noted that though the pedals can be reciprocating and dependent on each other, they may be independently movable. For example, one pedal could have a shorter lever arm than the other pedal, or be adjusted to have a different virtual gearing ratio or a weaker spring as a return mechanism, making it easier to press. Furthermore, one or both cables could be routed to a hand pull or some other alternative power input mechanism, for handicapped users or for additional power.

For purposes of the present application, an input mechanism is a mechanism that allows the user to add power to the mechanism. In the preferred embodiment, the power is added by a human; however, it is also possible for the power to be added by an animal or a mechanism. Because the present invention can use cables or other flexible drive lines for power transmission rather than, say, a bike pedal crank that forces the user's feet to move in a circular planar path, it is much easier to design the input mechanism in a way that is ergonomic for the user and allows the user's limbs to move in a more natural way. In addition, it is easy to "gang" additional drive lines onto the same pair, or to apply multiple dual one-way clutch combos to the same drive shaft. The latter feature can easily support multiple users on the same vehicle.

The input mechanisms may be permanently mounted on the vehicle, as in the preferred embodiment, or may be removable and modular. For example, a user with a chronic illness may be able to modify the vehicle from hand power to foot power, depending on their state of health at the time; or a family with multiple children, one with a disability, may be able to modify the vehicle so that both the disabled and the able-bodied child could use it, or a user can modify it in order to exercise different sets of muscles.

The pedals may be pivoted at the user's toe, as shown in FIGS. 4A-4D, or at the user's heel, or anywhere in between. Pivoting the pedals at the heel allows for better ergonomics, as the user's calf muscles can provide more power that way.

The pedals can comprise a return mechanism that forces them back up after they have been pushed. Such a return mechanism can be a pinion gear between two sprockets, so that pushing one pedal down pushes the other one up, or a cable connected over a pulley that pulls one pedal up when the other one is pushed down, or spring loading, or any other return mechanism known in the art.

Applications of this drive mechanism include, but are not limited to, bicycles, scooters, tricycles, wheelchairs, boats, roller skates, dollies, carts, wheelbarrows, and any other human-powered vehicles, as well as tools including but not limited to water pumps, lathes, generators, and winches. This drive mechanism may also be used for vehicles using other power sources, such as internal combustion engines, electricity, animal power, or any other power source.

The invention claimed is:

1. A drive assembly, comprising:
   an output shaft;
   a first one-way clutch, said first one-way clutch mechanically coupled with the output shaft along a common axis, said first one-way clutch having a power stroke along a forward direction of rotation and having a free spin along a backward direction of rotation;
   a second one-way clutch, said second one-way clutch coplanar with the first one-way clutch, said second one-way clutch having the power stroke along the forward direction of rotation and having the free spin along the backward direction of rotation;
   a transfer gear, said transfer gear mechanically engaged with the first one-way clutch and the second one-way clutch, wherein the transfer gear is configured to engage the power stroke of the first one-way clutch and the free spin of the second one-way clutch in a rotational direction, and wherein the transfer gear is configured to engage the power stroke of the second one-way clutch and the free spin of the first one-way clutch in an opposite rotational direction;
   an inside gear mechanically coupled with the transfer gear;
   an input mechanism mechanically coupled with the inside gear, the input mechanism configured for transferring a mechanical force from a power source to the transfer gear; and
   a scissor mechanism slidingly coupled along a rail of the inside gear, the scissor mechanism including a screw, that when tightened, operates to change an effective gearing of the vehicle.

2. The drive assembly of claim 1, where the first one-way clutch comprises a primary drive gear and a first small gear, the second one-way clutch comprises a secondary gear and a second small gear, and the transfer gear comprises a large input gear, the large input gear being mechanically coupled with the first small gear and the second small gear, where the first small gear and the primary drive gear are concentric and mechanically coupled to rotate in the same direction, and the second small gear and the secondary gear are concentric and mechanically coupled to rotate in opposite directions.

3. The drive assembly of claim 1, where the first one-way clutch comprises a primary drive gear and a first small gear, the second one-way clutch comprises a secondary gear and a second small gear, and the transfer gear comprises a large input gear, the large input gear being mechanically coupled with the first small gear and the second small gear, where the first small gear and the primary drive gear are concentric and mechanically coupled to rotate in opposite directions, and the second small gear and the secondary gear are concentric and mechanically coupled to rotate in the same direction.

4. The drive assembly of claim 1, where the input mechanism comprises one of the following group: a cable, a chain, a rope, a cord, and a belt.

5. The drive assembly of claim 1, wherein the input mechanism is configured to be operated by a human.

6. A wheeled vehicle comprising the drive train of claim 1.

7. The vehicle of claim 6, where the input mechanism comprises at least one foot pedal.

8. The vehicle of claim 6, where the input mechanism comprises at least one lever.

9. The vehicle of claim 6, where the input mechanism comprises at least one hand pull.

* * * * *